Nov. 2, 1948.   W. F. SHORE   2,453,042
GAUGE FOR MEASURING AND INDICATING THE
HARDNESS OF VARIOUS SUBSTANCES
Filed Feb. 27, 1946
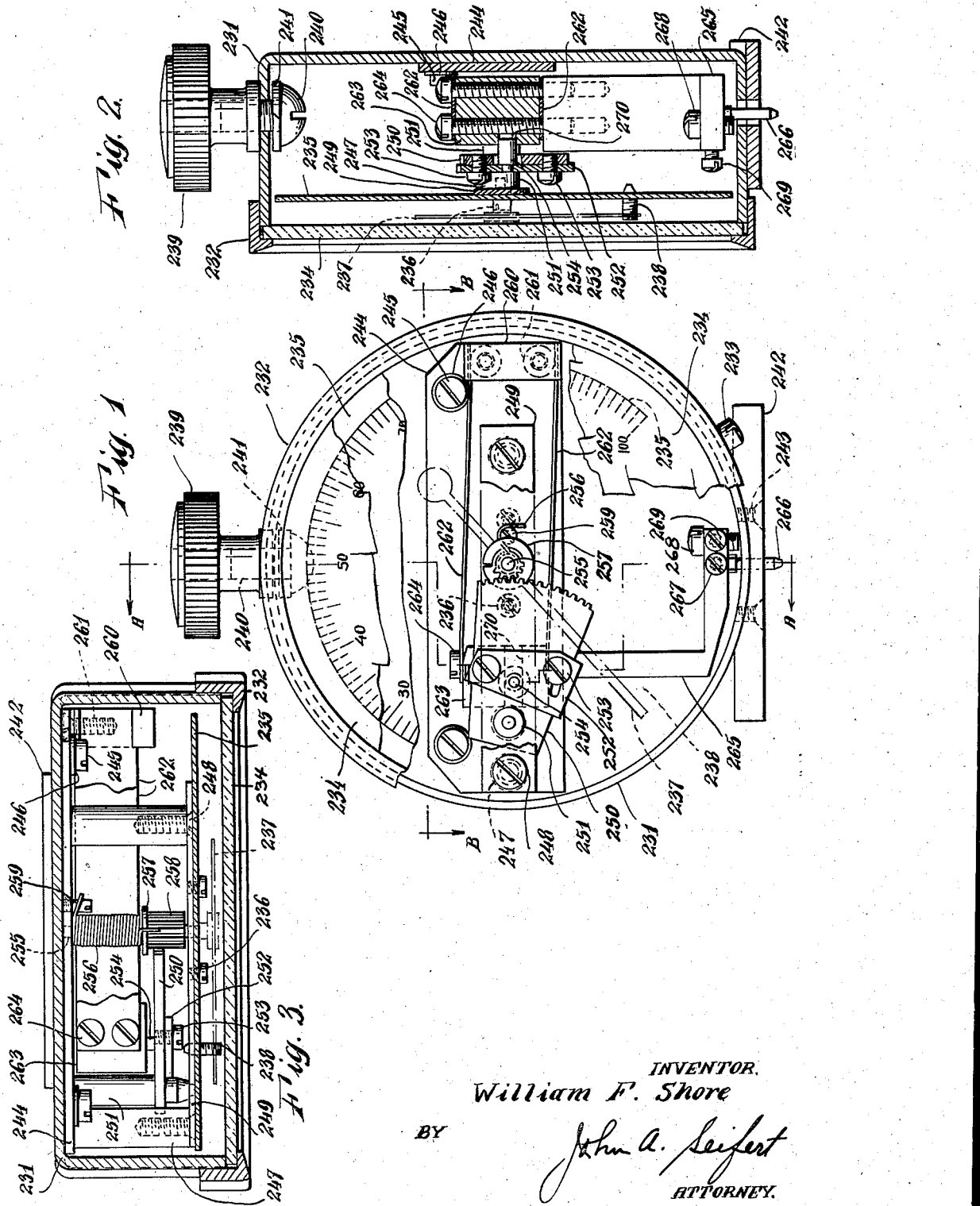
INVENTOR.
William F. Shore
BY
John A. Seifert
ATTORNEY.

Patented Nov. 2, 1948

2,453,042

UNITED STATES PATENT OFFICE 2,453,042

GAUGE FOR MEASURING AND INDICATING THE HARDNESS OF VARIOUS SUBSTANCES

William F. Shore, Freeport, N. Y.

Application February 27, 1946, Serial No. 650,449

7 Claims. (Cl. 73—81)

This invention relates to gauges for measuring and indicating the hardness of various substances, including metals and is particularly adapted for ascertaining the hardness of rubber and like substances.

The present invention is an improvement upon the invention disclosed in Letters Patent No. 1,768,639, granted to me and Albert F. Shore July 1, 1930, for Gauges, and it is the primary object of the invention to provide a gauge for measuring and indicating the hardness of substances of this character wherein all unnecessary friction between parts is eliminated and to provide a more consistent and accurately operating guage.

It is another object of the invention to provide an improved gauge for measuring and indicating the hardness of substances including a support arranged with an abutment on which is mounted a dial and a pointer movable relative to the dial, resilient means anchored on the support carrying a penetrator or indentor to engage in an opening in the abutment and normally projected to a predetermined extent through the abutment opening, the support being adapted to engage the penetrator under pressure with the substance the hardness of which is to be ascertained and the penetrator moved relative to the abutment against the tension of the resilient means proportional to the resistance of the substance to penetration thereof by the penetrator, and means operatively connecting the penetrator with the pointer to transmit the movement of the penetrator to and move the pointer relative to the dial in predetermined ratio to the movement of the penetrator.

Heretofore in measuring and indicating gauges of this character and as disclosed in the hereinbefore mentioned Letters Patent the indicating means including a graduated dial and a pointer movable relative thereto is mounted in a casing which in turn is mounted on a second casing arranged with a tubular projecting abutment in which a penetrator or indentor is slidable and also containing the measuring means actuated by the movement of the penetrator into the casing and means actuated by the measuring means to move the pointer relative to the dial in predetermined ratio to the movement of the measuring means, and the indicator casing mounted on a rack bar slidably carried by a press frame arranged with means to actuate the rack bar with the casings to forcibly engage the penetrator with the substance the hardness of which is to be ascertained. While the measuring means and indicating means carried thereby may be transported with the press frame to different locations of the substances the hardness of which is to be ascertained it is cumbersome to do so.

It is a further object of the invention to provide a compact structure of gauge for this purpose wherein the measuring and indicating means are of a unitary structure carried by a single support which may be readily transported and manipulated comprising an open side casing arranged with an abutment or base having an opening therein in line with the axis of the casing and the casing having mounted therein and disposed at the open side a dial and a pointer movable relative thereto adapted to be observed through a transparent closure for the open side of the casing, resilient means anchored in the casing carrying a penetrator slidable in the perforation or opening in the abutment or base of the casing and urged by the resilient means to position to project to a predetermined extent from the opening, and means for operatively connecting the penetrator to and actuating the pointer relative to the dial in predetermined ratio to the movement of the penetrator imparted thereto by the resistance of the substance the hardness of which is to be ascertained to the penetration thereof by the penetrator, and said casing provided with a knob adapted to be grasped by the hand to manipulate the gauge to engage the penetrator under pressure with the substance the hardness of which is to be ascertained.

Other objects and advantages of the invention with hereinafter appear.

In the drawing accompanying and forming a part of this application there is illustrated an embodiment of the improved gauge for measuring and indicating the hardness of substances, wherein Figure 1 is a front elevation of the gauge with portions of the dial broken away to illustrate operative parts of the gauge.

Figure 2 is a sectional view taken on the line A—A of Figure 1 looking in the direction of the arrows, and Figure 3 is a sectional view taken on the line B—B of Figure 1 looking in the direction of the arrows.

In the embodiment of the invention illustrated in the drawing the operative parts of the gauge are mounted upon a support or frame comprising a back plate 244 and a front plate 249 of less length and width than the back plate secured to the back plate to extend longitudinally from one end of and in parallel spaced relation to the back plate intermediate the longitudinal edges thereof by screws 248 extended through openings in the opposite ends of the front plate with the screw heads abutting said plate and the screws threaded into one end of spacing members or posts 247 disposed between the plates and fixed at the opposite ends in or to the back plate.

A dial 235 calibrated in values representative of pressure is mounted centrally thereof on the front frame plate by screws 236 with the center substantially midway the ends of the back plate and intermediate the longitudinal edges thereof. A pivot member or shaft 255 is rotatably supported in the front and back plates of the supporting frame axially of the dial with a portion of the shaft projecting through the dial on which is mounted a pointer 237 to have rotation with the shaft relative to the dial, the pointer being urged to normal zero position in engagement with an abutment or stop in the form of a screw 238 threaded into and projecting from the face of the dial by a spring 256 coiled about the shaft 255 and anchored at one end to a post 259 fixed in the back plate of the frame and at the opposite end to the flange 257 of a pinion 258 fixed on the shaft 255.

Sensitive resilient means adapted to be influenced under slight variations in pressure and carrying an indentor or penetrator is anchored to a block 260 secured by screws 261 to the end of the back plate 244 opposite the end from which the front frame plate extends and extending from the face of the back plate. This resilient means comprises a leaf spring member, shown as a pair of leaf springs 262 anchored at one end to opposite faces of the block 260 to extend in parallel spaced relation with one spring disposed at one side and the other spring at the opposite side of the pointer carrying shaft 255 by engaging one end of the springs in recesses in said faces of the block and secured in the recesses by deflecting the opposite walls of the recesses over the springs, as shown in Figures 1 and 3.

The penetrator or indentor is in the form of a pin 266 having a tapered end mounted in a carrier therefor consisting of a member of right angle or L form 265, the penetrator being mounted in an opening adjacent the end of the angle portion of the carrier of shorter length to extend at a right angle therefrom and secured in said opening by a set screw 267.

To maintain the free ends of the leaf springs 262 in spaced relation and connect the penetrator carrier 265 thereto, a block 263 is engaged between the free ends of the springs with a portion of said block extending beyond the ends of the springs. The springs are secured to said block and to the penetrator carrier by screws 264 extended through openings in the leaf springs and the block and threaded into openings in the end of the angle portion of greater length of the penetrator carrier, as shown in Figure 2.

To ascertain the hardness of substances the penetrator is engaged with the substance and pressure applied thereto by the frame through the leaf springs, the hardness of the substance being measured by the resistance of the substance to the penetration thereof by the penetrator moving the penetrator with its carrier 265 against the tension of and progressively increasing the tension of the leaf springs and indicating on the dial by the pointer the pressure resisted by the substance to the penetration thereof by the penetrator, the pointer being moved relative to the dial in predetermined ratio to the movement of the penetrator and its carrier. To actuate the pointer from the movement of the penetrator carrier a gear segment 250 is mounted on and rotatable with a pivot pin or shaft rotatably supported by the frame plates adjacent the left hand end thereof, as shown at 251 in Figure 1. The teeth of the gear segment mesh with a pinion 258 fixed on and rotatable with the pointer carrying shaft 255. The segment is operatively connected to and rocked from the movement of the penetrator carrier by a pivot stud 254 fixed at one end to and projecting from the side of a plate 252 extending transversely of and disposed intermediate the ends of the gear segment and secured thereto by screws 253 extended through openings in the opposite ends of said plate and threaded into the gear segment, as shown in Figure 2, the pivot stud being secured to the plate 252 by engaging a reduced end of the pivot stud in an opening in the plate intermediate the ends and peening over the end of said reduced portion. The pivot stud extends loosely through an opening in the gear segment and pivotally and slidably engages in a groove or recess 270 in and extending transversely of a face of the spring connecting block 263 in a direction longitudinally of the frame, said groove being in the nature of a cam groove. When the penetrator carrier is moved against the tension of the leaf springs 262 it imparts upward movement to the gear segment as viewed in Figure 1 and rotates the pinion 258 and therewith rotates the pointer against the tension of the spring 256.

The frame with the operative parts mounted thereon is mounted in a circular open side carrying casing 231 therefor by screws 245 engaging openings in the back plate of the frame with a washer 246 interposed between the screws and plate and threaded into the bottom wall of the casing and enclosed therein by a transparent closure 234, such as glass or plastic material, secured to the open side of the casing by a ring member or bezel 232 having a slip joint connection with the side wall of the casing and secured thereto by a screw 233. The casing is arranged with an abutment or base member 242 which may be integral with the casing or constructed separately from and secured to the casing as shown by screws 243, to extend transversely of the casing below and parallel with the frame as viewed in Figure 1, said base member having a flat face extending in a plane tangentially of the side wall of the casing and has an opening therethrough midway the ends in register with an opening in the side wall of the casing in line with the axis of the casing and the pointer carrying shaft 255 and into which opening the penetrator 266 extends and is projected to a predetermined extent from the face of the base member under the influence of the leaf springs 262 which is determined and limited by an adjustable abutment in the form of a screw 268 threaded into an opening in the penetrator carrier in parallel relation to the penetrator with the projecting end of the screw engaging the side wall of the casing, and the stop screw secured in adjusted position by a set screw 269, this positioning of the penetrator being such as to place the leaf springs under a slight tension, as shown in Figure 1. A hand engaging knob 239 having a portion of enlarged diameter the periphery of which is ribbed or knurled is secured to the side wall of the casing to extend laterally therefrom diametrically opposite to and in alinement with the opening in the base member by a screw 240 extended from within the casing through an opening in the side wall of the casing and threaded into a bore axially in the knob with a lock washer 241 interposed between the screw head and the casing. The casing is adapted to be manipulated by engaging or grasping the knob with the hand to engage the penetrator under pressure with the substance the hardness of which is to be ascertained. As stated, the penetrator carrier is yieldingly urged to predetermined position with the stop screw 268 engaging the casing wall under a slight flexure and tension of the leaf springs 262.

In operation the casing knob is grasped by the hand and the gauge manipulated to engage the penetrator with the substance under test and then pressure of the hand is applied to the knob thereby forcibly pressing the penetrator against the substance and the penetration resistance of the substance by the penetrator moving the penetrator inwardly of the base member and moving the penetrator carrier therewith against the tension of and progressively increasing the tension of the leaf springs and the pressure of the penetrator against the substance and the casing having a slight movement relative to the penetrator, sufficient pressure being applied to the casing to cause movement of the penetrator and casing relative to each other until the base member of the casing engages the substance under test and the penetrator moves inwardly of the base member but maintained in engagement with the substance under the tension of the leaf springs, the movement of the penetrator with the penetrator carrier rocking the gear segment and thereby moving the pointer relative to the dial in predetermined ratio to the movement of the penetrator and indicating on the dial the pressure of the leaf springs resisted by the substance to the penetration thereof by the penetrator and furnishing a way or expressing the hardness of the substance in terms of pressure.

The movement of the pointer in predetermined ratio to the movement of the penetrator is effected by the engagement of the pivot stud 254 in the recess or groove 270 in the leaf spring separating block 263 and connection of the pivot carrying plate 252 to the gear segment. To vary and adjust the ratio of movement of the pointer relative to the movement of the penetrator the lower connecting screw 253 for the pivot carrying plate 252 with the gear segment is adjustable and for which purpose the lower screw engaging opening in the plate 252 is elongated, as shown in Figure 1. To effect adjustment of the plate 252 the screw 253 engaging in the elongated opening is loosened and said plate with the pivot stud engaging in the recess 270 in the block 263 is adjusted relative to the gear segment and after adjustment the plate 252 is secured in adjusted position by tightening up said screw. The recess 270 permits adjustment of the plate 252 without affecting the connection between said plate, the gear segment 250 and the block 263. In order that the spring connecting and separating block 263 will not interfere with the proper flexing of the upper leaf spring 262 a portion of the upper surface of the block 263 is beveled to incline toward the inner vertical surface of said block, as shown in Figure 1.

Having described my invention, I claim:

1. In a gauge for measuring the hardness of substances, a support, a leaf spring member anchored at one end on the support, a member mounted on the free end of the spring member, a penetrator mounted on the member and urged by the spring member to predetermined position with the penetrator extending in a direction transversely and intermediate the ends of the spring member, a graduated dial fixed on the support, a pointer rotatable relative to the dial and yieldingly urged to zero position, said support adapted to forcibly impress the penetrator against the substance the hardness of which is to be tested, the penetrator having movement relative to the support against the tension of and increase the tension of the spring member proportional to the resistance of said substance to the penetration thereof by the penetrator and the support having movement relative to the penetrator toward the substance, and means to actuate the pointer relative to the dial from and in predetermined ratio to the movement of the penetrator and support relative to each other and indicate on the dial the pressure resisted by the substance to the penetration thereof by the penetrator.

2. In a gauge for measuring the hardness of substances, a support, a leaf spring member anchored at one end on the support, a penetrator, a carrier for the penetrator mounted on the free end of said spring member and positioning the penetrator to extend and have movement in a plane substantially perpendicular to and intermediate the ends of the spring member, and the spring member urging the penetrator to predetermined position, a graduated dial fixed on the support, a pointer rotatably mounted on the support axially of the dial and yieldingly urged to zero position, a hand engaging member fixed to the support in alinement and opposed relation to the penetrator whereby the gauge is adapted to be manipulated to engage the penetrator under pressure with the substance the hardness of which is to be tested and the resistance of the substance to the penetration thereof by the penetrator moving the penetrator against the tension of the spring member and the support relative to the penetrator toward the substance, a pinion rotatable with the pointer, a gear segment pivotally mounted on the support meshing with the pinion, and means connecting the segment to and imparting movement to the same from the penetrator carrier proportional to the movement of the penetrator and support relative to each other and transmitting said movement of the gear segment through the pinion to and actuating the pointer relative to the dial in predetermined ratio to the movement of the penetrator and indicate the pressure resisted by the substance to the penetration thereof by the penetrator.

3. In a gauge for measuring the hardness of substances, a cup shaped casing having a perforation in the side wall, a leaf spring member anchored at one end in and extending transversely of the casing with the casing perforation disposed below and in line with the axis of the casing and an intermediate portion of the spring member, a penetrator, a carrier on which the penetrator is mounted connected to and urged by the spring member to a position of rest with the penetrator extended to a predetermined extent from the casing perforation and disposed in a plane perpendicular to the spring member, a dial fixedly supported at the open side of the casing, a pointer having a pivot support rotatably mounted in the casing axially of the dial and urged to normal zero position relative to the dial, said penetrator to be engaged under pressure with the substance the hardness of which is to be ascertained by the casing and the casing moved relative to the penetrator into engagement with the substance under test by the resistance of said substance to the penetration thereof by the penetrator and move the penetrator against the tension of the spring member in proportion to the penetration resistance of the substance by the penetrator, a pinion rotatable with the pointer, a gear segment pivotally supported in the casing meshing with the pinion, and means connecting the gear segment to the penetrator carrier and rocking the segment by the movement of the penetrator and casing relative to each other and transmit said movement of the gear segment through the pinion to and actuating the pointer relative to the dial in predetermined ratio to the movement of the penetrator and casing and indicate on the dial the pressure resisted by the substance to the penetration thereof by the penetrator.

4. In a gauge for measuring the hardness of substances, an open end casing having a perforation in the side wall, a frame mounted centrally in and extending transversely of the casing with the casing perforation below said frame in alinement with the axis of the casing, a pair of leaf springs anchored at one end on the frame to extend in parallel spaced relation transversely of the casing with the springs at opposite sides of the axis thereof, a penetrator, a carrier on which penetrator is mounted, means connecting the free ends of the springs in spaced relation and to the penetrator and the springs urging the penetrator carrier in a direction to engage the penetrator in the casing perforation, means adjustably mounted in the penetrator carrier to abut the side wall of the casing and limit said movement of the penetrator carrier with the penetrator projecting to a predetermined extent from the casing perforation, a dial fixed on the frame centrally of the open side of the casing, a pointer having a pivot rotatably mounted in the frame axially of the dial, a transparent closure for the open side of the casing, a hand grip mounted in the side wall of the casing opposed to and in alinement with the casing perforation adapted for engaging the penetrator with the substance the hardness of which is to be ascertained and apply pressure to the penetrator, the penetration resistance of said substance to the penetrator moving the penetrator carrier relative to the casing against the tension of the springs and the casing relative to the penetrator toward the substance, means operative to rotate the pointer relative to the dial in predetermined ratio to the movement of the penetrator and casing.

5. A gauge for measuring the hardness of substances as claimed in claim 4, wherein the means to connect the free ends of the springs in spaced relation and to the penetrator carrier, comprises a block disposed between the free ends of the springs, and screws extended through openings in the springs and block and threaded into the penetrator carrier.

6. A gauge for measuring the hardness of substances as claimed in claim 4, wherein the penetrator carrier is substantially of right angle form and the free ends of the springs are connected to the end of one angle portion and the carrier extending downwardly from the springs with the other angle portion extending longitudinally of the springs and in which angle portion the penetrator is mounted, and the means limiting the movement of the penetrator carrier under the tension of the springs with the penetrator projecting to a predetermined extent from the casing perforation, comprises an abutment adjustably carried by the angle portion of the penetrator carrier in which the penetrator is mounted adapted to engage the side wall of the casing at the side of the perforation.

7. In a gauge for measuring the hardness of substances, a frame, a block secured to one end of said frame, a pair of leaf springs anchored at one end to opposite sides of said block to extend in spaced parallel relation longitudinally of the frame, a block between and maintaining the free ends of the springs in spaced relation having a recess extending transversely of a side and longitudinally of the springs, a penetrator, a carrier in which the penetrator is mounted, screws securing the springs and the penetrator carrier to said block and the springs urging the carrier to position the penetrator to a predetermined extent, a graduated dial mounted on the frame, a pointer rotatably supported by the frame axially of the dial, a pinion rotatable with the pointer, a gear segment pivotally mounted on the frame meshing with said pinion, a plate adjustably mounted on the gear segment to extend transversely thereof intermediate the ends of the gear segment, and a pivot member fixed at one end to said plate extending loosely through an opening in the gear segment and rotatably and slidably engaging the recess in the spring separating block to compensate for the adjustment of the plate on the gear segment.

WILLIAM F. SHORE.

REFERENCES CITED

The following references are of record in the file of this patent:

UNITED STATES PATENTS

| Number | Name | Date |
| --- | --- | --- |
| 1,483,565 | Adams | Feb. 12, 1924 |
| 1,549,115 | Hancock | Aug. 11, 1925 |
| 2,324,586 | Klein et al. | July 20, 1943 |
| 2,329,827 | Clark | Sept. 21, 1943 |

FOREIGN PATENTS

| Number | Country | Date |
| --- | --- | --- |
| 603,531 | Germany | Oct. 3, 1934 |